Figure 4:
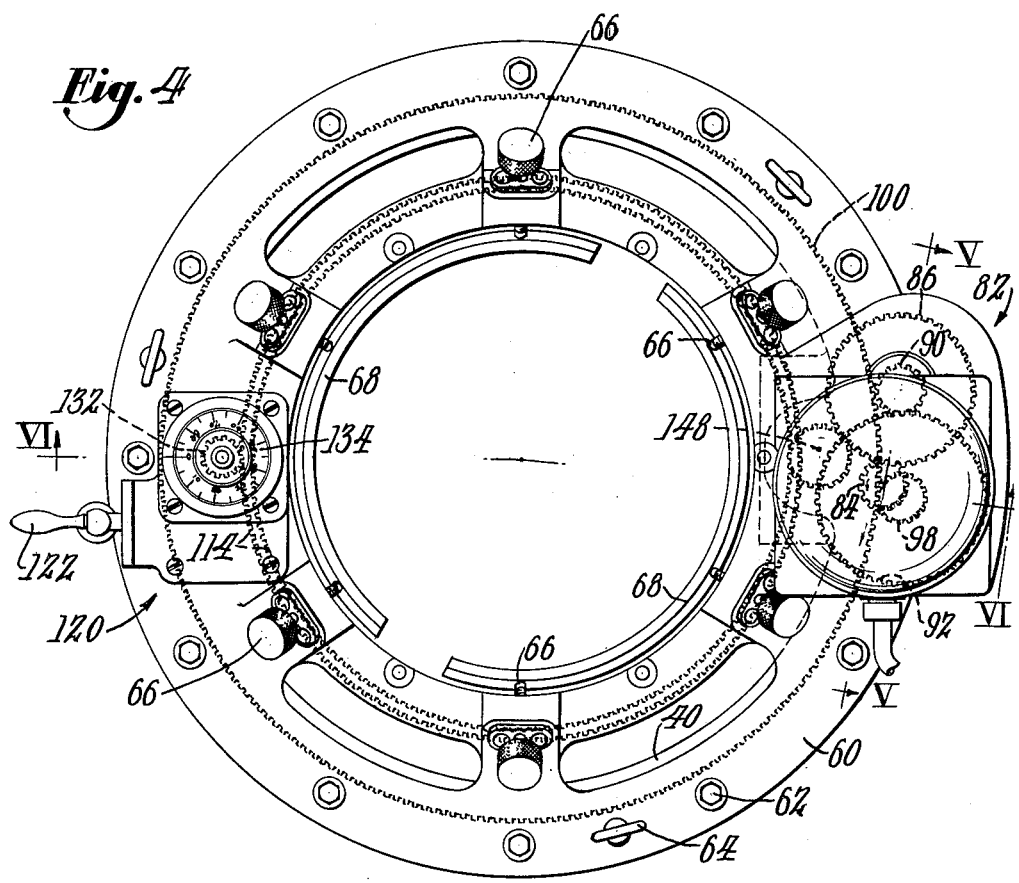

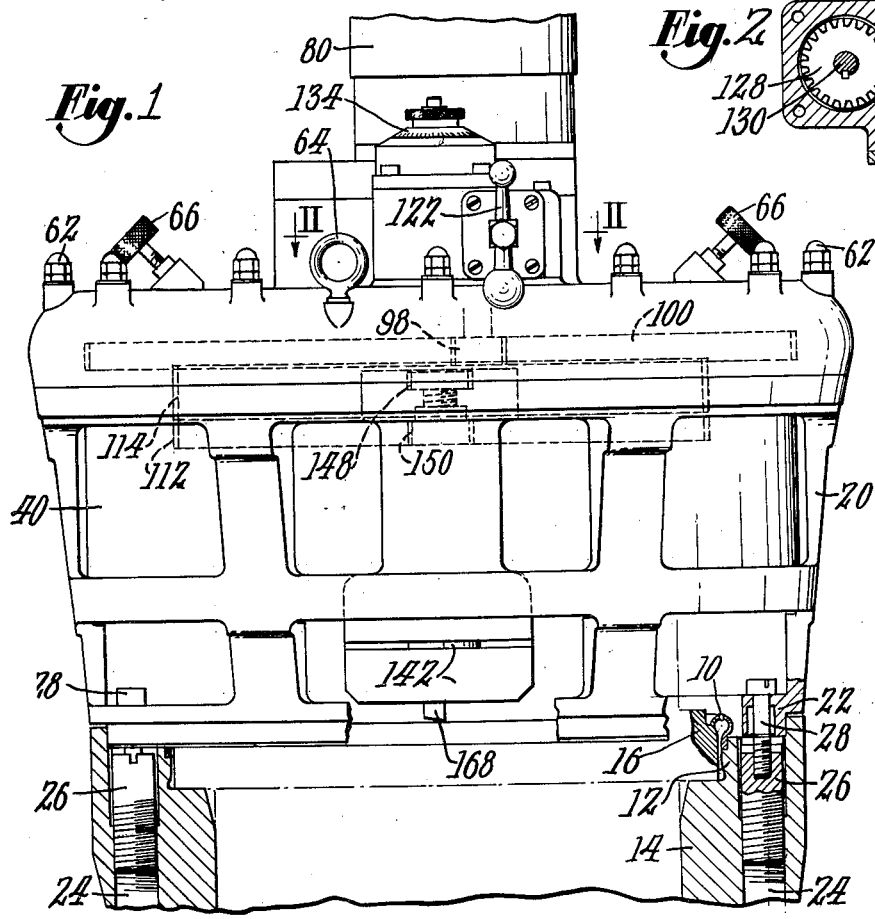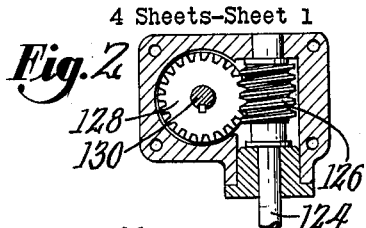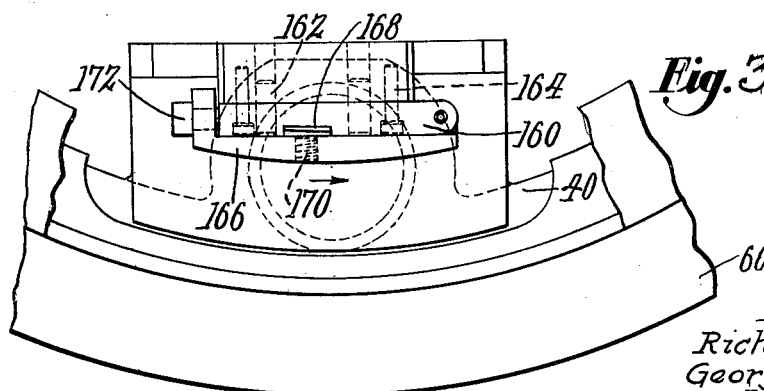

Feb. 26, 1963    R. B. MAXNER ET AL    3,078,749
CUTTING APPARATUS
Filed July 30, 1959    4 Sheets-Sheet 2

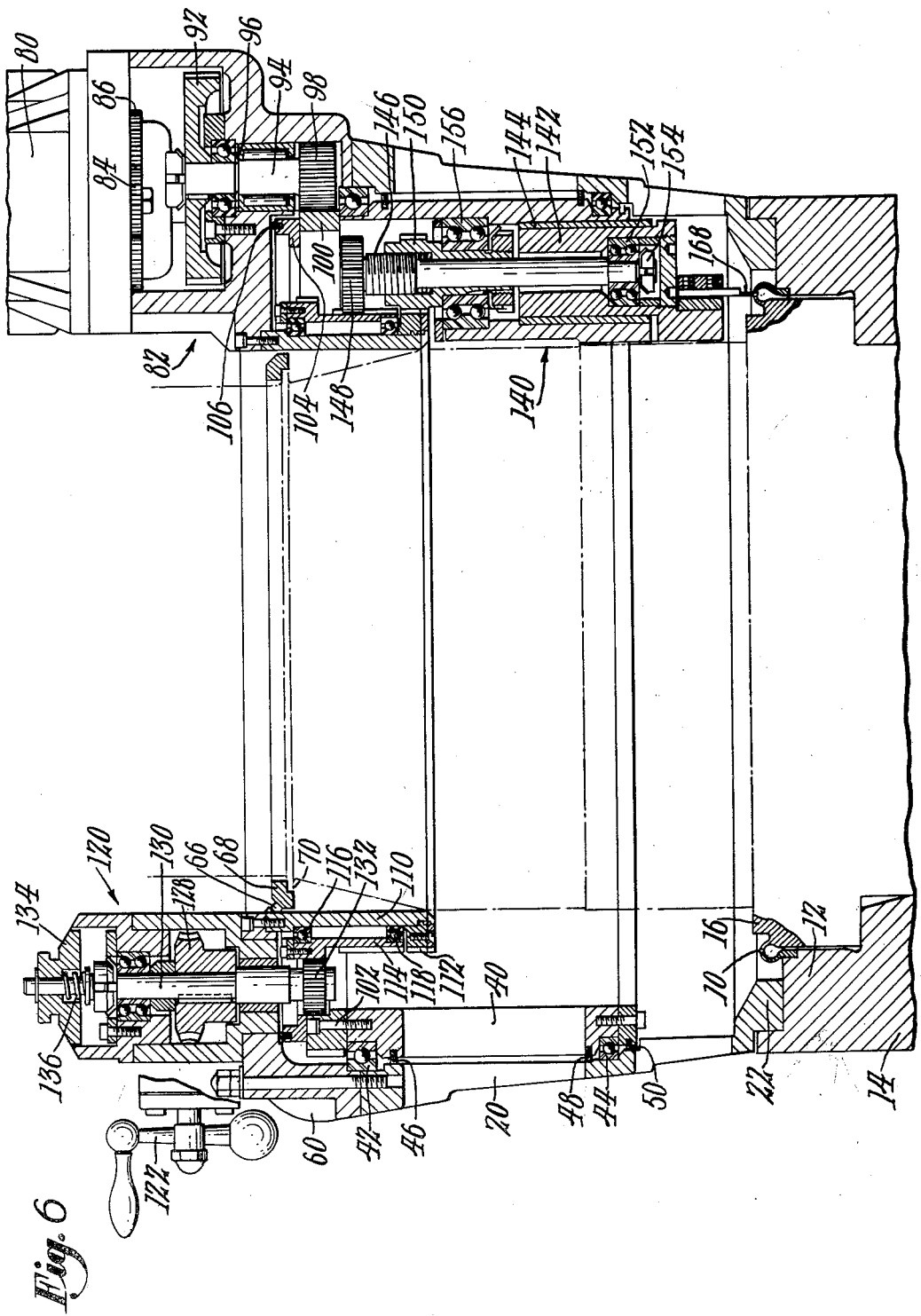

Feb. 26, 1963  R. B. MAXNER ET AL  3,078,749
CUTTING APPARATUS
Filed July 30, 1959  4 Sheets-Sheet 4
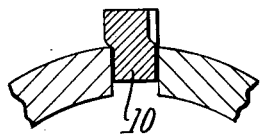
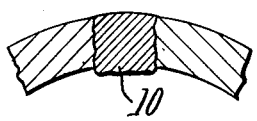
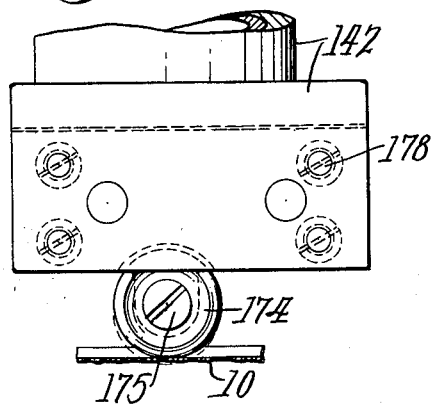
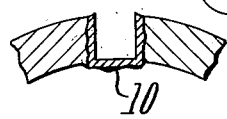
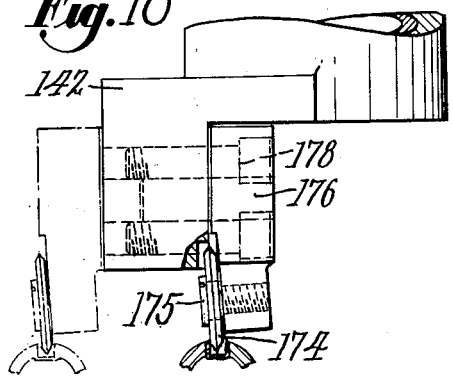
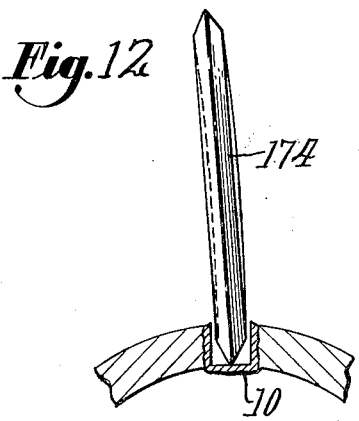

United States Patent Office 3,078,749
Patented Feb. 26, 1963

3,078,749
CUTTING APPARATUS
Richard B. Maxner, Beverly, and George H. Cooper and Leonard W. Kupreance, Middleton, Mass., assignors to United Shoe Machinery Corporation, Flemington, N.J., a corporation of New Jersey
Filed July 30, 1959, Ser. No. 830,566
3 Claims. (Cl. 82—4)

This invention relates to apparatus for cutting metal and more specifically for cutting apart an omega seal between two parts of an atomic reactor. The invention is illustrated as embodied in apparatus for severing an omega seal between the standpipe rim of a reactor-head and the flange of a control rod mechanism.

An omega seal is a heremetic closure between two parts such as the standpipe and mechanism referred to above, which parts are usually mechanically supported by means other than the seal. In plan view the seal resembles a tube which has been split and the cut edges secured to the parts. As seen in cross section, the form of a complete seal approximates that of the Greek capital letter "omega" in having two arms integrally joined in a loop.

The province of the omega seal between the standpipe and mechanism is, firstly, to provide a hermetic seal between the parts, secondly, to provide flexibility to accommodate thermal expansion, and thirdly, to facilitate unsealing and resealing, for example, for reloading purposes. Conveniently therefore the seal is initially in two pieces as if the seal had been slit along the middle of the loop portion leaving two pieces corresponding in cross section to the two arms. For an annular seal, the two pieces are called seal rings. Each ring is either formed integrally with a part or is bonded, as by welding, to one of the parts to be seal leaving an upstanding loop portion terminating in a lip. When the parts are assembled, the lips are adjacent and may be welded together to close the loop and form the seal.

The primary purpose of the illustrative apparatus is to cut in two the horizontal circular omega seal between the reactor standpipe and control rod drive mechanism. The apparatus can be adapted for cutting other omega seals, for example, the upper mechanism to unit cell seal of an S3G reactor. Typically the metal to be cut is stainless steel of the A.I.S.I. 300 series.

The illustrative apparatus comprises a frame adapted for attachment to the standpipe. A motor driven cage rotatable within the frame carries a tool in a circular path over the seal. A lathe-type cutting tool is employed initially making a number of passes until a predetermined depth of cut is reached.

In accordance with a feature of the present invention, means are provided for feeding the cutting tool into the cut by manual rotation of a handle on the frame while the cage is rotating.

In many types of reactors including the S3G, the utmost care must be taken to preserve the cleanliness of the interior environment. If the standpipe cut were to be continued until the rings were severed, there would be danger that chips of metal would fall into the interior of the reactor. Accordingly, after the initial cut has been made to its predetermined depth, the cutting tool is removed and a blunt edged parting tool is inserted in its place and carried about the seal in pressure contact with the base of the cut to break through the remaining web.

In accordance with another feature of the present invention, the parting tool comprises a dished wheel having a periphery tapering to a blunt edge. The periphery is somewhat narrower than the cut and the dished form permits the wheel to track in the cut without engagement of the side walls while the breaking through operation is in progress.

Figure 5:
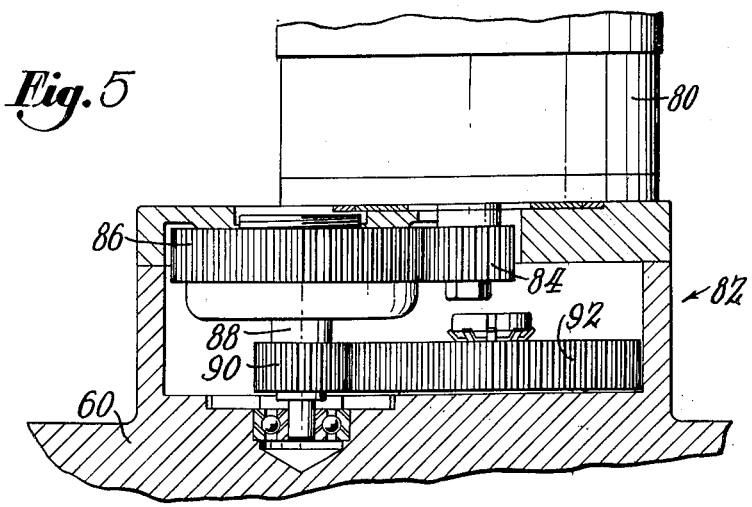

Other features and advantages of the invention will best be understood by the following description taken in connection with the accompanying drawings, in which:

FIG. 1 is an elevation, partly in section, of apparatus embodying the present invention;
FIG. 2 is a section taken on line II—II of FIG. 1;
FIG. 3 is a horizontal view, looking upward, of a front bottom portion of the machine of FIG. 1;
FIG. 4 is a plan view of the apparatus of FIG. 1;
FIG. 5 is a section taken on line V—V of FIG. 4;
FIG. 6 is a vertical diametrical section taken on line VI—VI of FIG. 4;
FIG. 7 is a partial section of two seal rings with a consumable insert supported between the lips of the rings prior to welding;
FIG. 8 is a partial section of the seal resulting from the welding of the parts shown in FIG. 7;
FIG. 9 is a partial section of the seal of FIG. 8 after taking an initial cut to a predetermined depth;
FIG. 10 is an elevation of a portion of the apparatus of FIG. 1;
FIG. 11 is a side elevation of the portion shown in FIG. 10;
FIG. 12 is a partial section of the seal shown in FIG. 9 illustrating the parting operation; and
FIG. 13 is a partial section illustrating the result of the operation indicated in FIG. 12.

Referring to the drawings, FIG. 1 illustrates the apparatus of the present invention disposed for cutting an omega seal 10 between the rim 12 of a standpipe 14 and a flange 16 of an S3G instrumented unit cell.

The apparatus of the present invention comprises an annular outer frame 20 having a bottom rim 22 adapted to mate with the flanged rim 12 of the standpipe. In the top of the standpipe are eighteen circumferentially spaced bolt holes 24 which in normal operation of the reactor are occupied by bolts holding a clamp ring for the flange 16. For attaching the present apparatus, the bolts and clamp ring have been removed. Into six of the clamp ring bolt holes 24, four clamp studs 26 and two standpipe locating plugs (not shown) are inserted. The clamp studs 26 adapt the large bolt holes 24 for the smaller machine clamp screws 28 which secure the frame to the standpipe.

Inside the frame 20, an inner cage 40 (FIG. 6) is mounted for rotation on a vertical axis by means of upper and lower ball bearings 42, 44. The upper bearing 42 is protected by a dust shield 46 while the lower bearing is protected by dust shields 48 and 50.

At the top of the frame 20 a mounting cover 60 is attached by eleven cover studs 62. Three eyebolts 64 are also spaced around the rim of the cover. Six holddown clamp screws 66 on the cover are used to apply pressure to the control drive mechanism during the cutting operation. Holddown ring segments 68 are inserted around the upper mechanism assembly of the control drive mechanism and over the lip 70 (FIG. 6) of the lower cooling jacket on the main housing of the upper mechanism assembly. The holddown clamp screws bind down on the chamfered surface of the holddown segments with sufficient force to prevent shifting of the control drive mechanism under the cutting machine torque forces.

The cover supports an electric motor 80 and a reduction gear assembly 82 that drive the inner cage. The gear train of the assembly 82 is shown in FIG. 5 and comprises a motor pinion 84 meshing with a gear 86 on a shaft 88 and a pinion 90 on the shaft 88 meshing with a gear 92 at the output of the assembly. The gear 92 is secured to a shaft 94 (FIG. 6) mounted vertically in ball bearings 96 in the assembly. The shaft extends downwardly to a pinion 98 to engage an azimuth gear 100 attached to the cage 40 by screws 102. At the top of the azimuth gear 100 is a flange 104 supporting a dust shield 106 in engagement with the cover. On the underside of the cover adjacent its inner rim is attached a gear sleeve 110 to which is attached a stationary gear 112 and a live ring gear 114 rotatably supported on ball bearings 116 and 118. The live ring gear is made with two sets of teeth, one set on the upper and larger outside diameter, the other set being stepped down on the lower and smaller outside diameter. The lower set of teeth on the live ring gear matches in number and shape the teeth on the stationary gear 112.

On the cover opposite the electric motor and reduction gear assembly is the upper section 120 of the tool feed assembly. The upper section of the tool feed assembly transmits movement for tool feeding from a handle 122 mounted on a shaft 124 (FIG. 2), through a worm 126 and a gear 128 to a vertical shaft 130 and thence by a pinion 132 (FIG. 6) to the live gear 114. A micrometer dial 134 attached to the top of the worm gear shaft indicates the depth of cut. The dial may be set to any desired position by depressing it against a spring 136 and turning it to the desired position.

The lower section 140 (FIG. 6) of the tool feed assembly is mounted on the inner side of the cage 40. It comprises a tool slide 142 mounted for limited vertical movement in a sleeve 144 secured to the cage 40. A lead screw 146 carries a pinion gear 148 engaging the live ring gear 114. The lead screw runs in threads cut in the center of a nut gear 150 and is supported and held in the tool slide below by a tool slide bearing 152. The bottom of the lead screw shoulders on the tool slide bearing inner race and extends through the bearing where it is locked from below by a lock nut 154. By this connection, the tool slide moves vertically with the lead screw 146. The nut gear 150 rotates in a nut gear bearing 156 which holds the nut gear against vertical movement while allowing it to rotate freely. The nut gear is formed with teeth meshing with the stationary gear 112. Accordingly, relative rotation of the stationary gear 112 and the live ring gear 114 effects vertical movement of the tool slide 142.

At the bottom of the tool slide 142 is fastened a tool holder 160 (FIG. 3), the holder being attached by two dowel pins 162 and four binding screws 164. The slide 142 is adapted to receive a holder on either side according to the radius of the seal cut. A tool cap 166 is pivoted at one end of the tool holder. In closed position, as shown in FIG. 3, the tool cap encloses a rectangular slot in which the shank of a weld cutting tool 168 is held by two tool cap set screws 170. The tool cap is held in its closed position by a tool cap locking screw 172.

In operation, for cutting the standpipe weld as shown in FIGS. 1 and 6, the apparatus is lowered over the upper mechanism and bolted to the standpipe by tightening the screws 28 into the studs 26 in the standpipe bolt holes. The two holddown segments 68 are applied around the upper mechanism and the holddown clamp screws 66 tightened. With the tool slide in raised position, a tool holder is attached to the lower portion thereof using appropriate shims for bringing the cutting tool over the center of the omega seal when the tool is clamped in the tool holder. Thereafter the electric motor is started and the cutting tool fed downward by rotation of a handle 122 until the cutting tool touches the top of the seal, the initial cross section of which is shown in FIG. 8. At this point the micrometer dial may be turned to zero and the tool manually fed by rotation of the handle 122 until sufficient metal has been removed by the cutting tool to leave a web of approximately 0.015" to 0.020" thickness (FIG. 9). At this point the drive motor is stopped, the cutting tool 168 and holder 160 are removed and a breakthrough tool 174, rotatably mounted on a screw 175 in a holder 176 (FIG. 10), is attached to the bottom of the tool slide by four screws 178 passing through the holder into the tool slide.

The breakthrough tool 174 is a hardened steel disc or roll ⅝" in diameter and 0.050" thick having parallel side walls and a periphery tapering to a rounded edge, the sides of the tapered portion being approximately 60° to each other. In order that the roll may track in the curved trench of the cut without engagement of the periphery of the roll with the sides of the cut, the roll is dished while the axis of rotation of the roll is so oriented that the side faces of the lower or distal portion of the roll are parallel with the path of movement of the tool slide and thus with the side walls of the cut (FIG. 12). Preferably therefore the roll has a radius of curvature substantially equal to the radius of the cutting circle and its axis of rotation passes through the center of said circle. Thus while a roll may be mounted on the inner side of the slide 142, as shown in phantom in FIG. 10, for breaking through cuts having a smaller radius, the roll used in this position will have a smaller radius of curvature and have a greater tilt than the roll mounted on the outside of the slide (shown in full) since the cutting circle has a smaller radius.

After the breakthrough tool has been installed, the electric motor is again started and the breakthrough tool fed into the cut progressively until the seal is completely broken through.

Having thus described our invention, what we claim as new and desire to secure by Letters Patent of the United States is:

1. In apparatus for cutting an annular groove in a metal work piece, in combination, a frame adapted to be mounted in fixed disposition relative to a metal work piece, a cage mounted on said frame for rotary movement relative thereto, power means for effecting rotation of said cage, a tool slide mounted on said cage and adapted to support a cutting tool, said slide being mounted for linear movement relative to said cage in a feed path in feeding a cutting tool toward and away from the work piece, a feed handle rotatably mounted on the frame, and means for effecting feeding movement of the tool slide by rotation of the handle, said means comprising a lead screw and nut connected to said cage and to said tool slide for relative rotation to cause feeding movement of said slide, a first pinion connected to said screw, a second pinion connected to said nut, a first gear fixed to said frame and meshing with one of said pinions throughout the rotational range of said cage, a second gear mounted on said cage for rotary movement relative thereto and engaging said other pinion throughout the rotational range of said cage, the two gear and pinion ratios being equal, and connections on said frame between said rotatable feed handle and the movable gear for effecting rotation of the gear by movement of the handle.

2. In cutting apparatus, in combination, a frame adapted to be secured to a workpiece, a support rotatably mounted on said frame, tool holding means carried on said support for movement relative thereto in a path parallel to the axis of rotation of the support in moving a tool carried by said means toward and away from the surface of the workpiece, manually operable means on said frame for effecting movement of said tool holding means toward and away from the workpiece and a dished roll formed at its outer portion with parallel side walls and a periphery tapering to a rounded edge, said roll being rotatably mounted on said holding means in such orientation that the side walls of the roll at its distal portion are substantially parallel to the path of movement of the holding means.

3. In cutting apparatus, in combination, a frame adapted to be secured to a workpiece, a support rotatably mounted on said frame, tool holding means carried on said support for movement relative thereto in a path parallel to the axis of rotation of the support in moving a tool carried by said means toward and away from the surface of the workpiece, manually operable means on said frame for effecting movement of said tool holding means toward and away from the workpiece and a dished roll formed at its outer portion with a periphery tapering to a rounded edge, said roll having a radius of curvature substantially equal to the radius of the circle in which said roll is carried bodily on said support and said roll being mounted on said holding means so that its axis of rotation passes substantially through the center of the circle described by the point of engagement of the roll with a workpiece during rotation of said support.

References Cited in the file of this patent

UNITED STATES PATENTS

| | | |
|---|---|---|
| 1,033,279 | Simpson | July 23, 1912 |
| 1,065,629 | Simpson | June 24, 1913 |
| 2,291,899 | Jones | Aug. 4, 1942 |
| 2,436,152 | Richards | Feb. 17, 1948 |
| 2,541,412 | Frost | Feb. 13, 1951 |
| 2,842,238 | Shaw et al. | July 8, 1958 |